United States Patent [19]

Lundberg et al.

[11] Patent Number: 5,389,271
[45] Date of Patent: Feb. 14, 1995

[54] SULFONATED OLEFINIC COPOLYMERS

[75] Inventors: Robert D. Lundberg, Flemington; Robert R. Phillips, Spring Lake Heights, both of N.J.

[73] Assignee: Exxon Research & Engineering Co., Florham Park, N.J.

[21] Appl. No.: 77,577

[22] Filed: Jun. 15, 1993

[51] Int. Cl.[6] .................................. C10M 151/00
[52] U.S. Cl. ...................... 252/33; 252/48.2; 525/331.9; 525/332.1; 525/353
[58] Field of Search ................. 252/48.2, 33; 525/331.9, 332.1, 353

[56] References Cited

U.S. PATENT DOCUMENTS

| | | |
|---|---|---|
| 4,105,647 | 8/1978 | O'Farrell et al. ............ 525/353 |
| 4,157,432 | 6/1979 | Lundberg et al. ............ 525/353 |
| 4,303,766 | 12/1981 | O'Farrell et al. ............ 525/353 |
| 4,361,658 | 11/1982 | Lundberg et al. ............ 525/353 |
| 4,382,005 | 5/1983 | Miller ............................ 252/33 |
| 4,387,174 | 6/1983 | Lundberg et al. ............ 524/66 |
| 4,778,614 | 10/1988 | Rawlinson et al. ........... 252/33 |
| 4,897,088 | 1/1990 | Ishikawa et al. .............. 525/353 |

*Primary Examiner*—Ellen M. McAvoy
*Attorney, Agent, or Firm*—Joseph J. Dvorak

[57] ABSTRACT

The present invention provides novel sulfonated ethylene/alpha olefin copolymer compositions obtained by sulfonating ethylene/alpha olefin copolymer having number average molecular weights in the range of about 800 to about 50,000, and which have a high degree of terminal unsaturation. Preferably, at least 30% of the terminal unsaturation is vinylidene terminal unsaturation. Also, the alpha olefin preferably has 3 to about 12 carbon atoms.

11 Claims, No Drawings

SULFONATED OLEFINIC COPOLYMERS

FIELD OF THE INVENTION

The present invention relates to sulfonated olefinic copolymers and, more specifically, to sulfonated ethylene/alpha olefin copolymers which are prepared from ethylene/alpha olefin copolymers which possess terminal unsaturation, especially vinylidene unsaturation.

BACKGROUND OF THE INVENTION

The sulfonation of unsaturated polymers such as ethylene/propylene/norbornene terpolymers (EPDM polymers) is well known. The unsaturation available in these polymer compositions permits facile sulfonation and the neutralized adducts have found a variety of applications. Indeed, the utility of such sulfonated polymers is generally related to their multiple ionic sites, which are capable of forming molecular associations creating a network. Unfortunately, these molecular associations in conventional sulfonated olefin polymers such as sulfonated EPDM (sulfo-EPDM), are undesirable in certain types of applications. For example, sulfo-EPDM is very effective as a viscosity modifier in lubricating oils at moderately high concentrations (cf U.S. Pat. No 3,931,021). At those concentrations, the interpolymer associations due to multiple ionic crosslinks between polymer chains make such ionic polymers much more effective as thickening agents than their nonionic EPDM precursors. At lower concentrations, however, sulfo-EPDM is found to be much less effective in thickening hydrocarbon fluids such as mineral oils. Indeed, these ionic polymers are even less effective than their nonionic polymer precursors. These results have been explained as being the consequence of intramolecular association (cf R. D. Lundberg, *J. of Applied Polymer Sci.*, 27, 12, p. 4630, 1982).

Accordingly, it is an objective of the present invention to provide a new class of functionalized polymers that does not have multiple ionic associations.

It is another object of the present invention to provide novel sulfonated ethylene/alpha olefin copolymers.

These and other objects of the present invention will become readily understood upon reading of the invention which follows.

SUMMARY OF THE INVENTION

The present invention provides novel sulfonated ethylene/alpha olefin copolymer compositions obtained by sulfonating ethylene/alpha olefin copolymer having number average molecular weights in the range of about 800 to about 50,000, and which have a high degree of terminal unsaturation. Preferably, at least 30% of the terminal unsaturation is vinylidene terminal unsaturation. Also, the alpha olefin preferably has 3 to about 12 carbon atoms.

The neutralized sulfonated polymers of the present invention have particular utility as viscosity modifiers of hydrocarbon fluids and especially as lubricating oil additives. Thus, another embodiment of the present invention includes a lube oil composition comprising an oil of lubrication viscosity and an effective amount of a neutralized sulfonated copolymer of an ethylene/alpha olefin copolymer having a high degree of terminal unsaturation and a number average molecular weight of about 800 to about 50,000.

DETAILED DESCRIPTION OF THE PRESENT INVENTION

The ethylene/alpha olefin copolymers suitable for use in forming the sulfonated compositions of the present invention typically will have an ethylene content in the range of about 30 to 90 wt. % and preferably in the range of about 35 to 70 wt. %. The remainder of the polymer will be made up of an alpha olefin having from 3 to about 12 carbon atoms. Indeed, propylene and butene-1 are particularly preferred as the alpha olefin.

The ethylene/alpha olefin copolymer also will generally possess a number average molecular weight of between about 800 to about 50,000 and, most preferably, between about 800 and 30,000. Importantly, the copolymer will possess terminal unsaturation.

It is not necessary, however, that all of the unsaturation in the copolymer be terminal unsaturation, although it is preferred that at least 50% of the unsaturation of the polymer and preferably at least 70% of the unsaturation in the polymer be terminal unsaturation. Additionally, it is particularly preferred that at least 30% and preferably 50% of the terminal unsaturation be vinylidene unsaturation.

Ethylene/alpha olefin copolymers having the foregoing properties can be prepared by polymerizing monomer mixtures comprising ethylene in combination with other monomers such as alpha-olefins having from 3 to 28 carbon atoms (and preferably from 3 to 4 carbon atoms, i.e., propylene, butene-1, and mixtures thereof) in the presence of a catalyst system comprising at least one metallocene (e.g., a cyclopentadienyl-transition metal compound) and an alumoxane compound. The comonomer content can be controlled through the selection of the metallocene catalyst component and by controlling the partial pressure of the various monomers.

The catalysts employed in the production of the preferred polymers are organometallic coordination compounds which are cyclopentadienyl derivatives of a Group 4B metal of the Periodic Table of the Elements (56th Edition of Handbook of Chemistry and Physics, CRC Press (1975)) and include mono, di and tricyclopentadienyls and their derivatives of the transition metals. Particularly desirable are the metallocene of a Group 4B metal such as titanium, zirconium, and hafnium. The alumoxanes employed in forming the reaction product with the metallocenes are themselves the reaction products of an aluminum trialkyl with water. The preferred terminally unsaturated interpolymer to be used in this invention may be prepared as described in U.S. Pat. No. 4,668,834 and in European Patent Publications 128,046 and 129,368, the disclosures of all of which are hereby incorporated by reference.

The ethylene/alpha olefin polymers used herein are readily sulfonated by contacting the polymer, for example, in a solvent such as hexane, cyclohexane, heptane or pentane with a sulfonating agent such as acetylsulfate. Typically, the contacting will be done at temperatures in the range of about 0° C. to 100° C. Typically, an excess of sulfonating agent will be employed, ranging from a 1% excess over the amount of double bonds which are intended to be sulfonated up to 10 fold excess. In those cases where a high molecular weight polymer of 15,000 or so is to be sulfonated, an excess of 5 fold reagent can be used to ensure that the reaction is substantially complete.

The resulting sulfonic acid derivative can then be neutralized with basic materials such as ammonium hydroxide, sodium, lithium, potassium hydroxides, zinc acetate, sodium acetate, lithium acetate, sodium methoxide and the like. The desired extent of neutralization will determine, to a certain extent, the amount of neutralizing agent used in neutralizing the sulfonic acid groups. Since it is preferred that neutralization be substantially complete, the amount of neutralizing agent used preferably will be in excess of the amount of sulfonating agent originally employed.

Neutralized sulfonated polymers of the present invention have unique properties that make them suitable for use as viscosification agents and the like. Of particular interest is the use of the neutralized sulfonated polymers of the present invention as additives for lubricating oils. When used in lubricating oil compositions, it is preferred that the ethylene/alpha olefin copolymer that is sulfonated and neutralized in accordance with the present invention have a number average molecular weight in the range of about 5,000 to 50,000. Thus, the present invention also encompasses a composition comprising a lubricating oil containing an effective amount of neutralized sulfonated ethylene/alpha olefin copolymer obtained by sulfonating an ethylene/alpha olefin polymer having a number average molecular weight in the range of about 5,000 to 50,000 and containing at least 50% of terminal unsaturation, and thereafter neutralizing said sulfonated polymer. In general, the lube oil composition will contain from about 0.01 wt. % to about 10 wt. % of the neutralized polymer, based on the weight of lubricating oil.

Because of the unique properties of the polymers of the present invention, they can be used to modify the viscosity of hydrocarbon fluids, like xylene, by adding to the hydrocarbon fluid from about 0.1 wt. % to about 20 wt. % of the neutralized sulfonated copolymer.

The following examples illustrate preferred embodiments of the present invention.

EXAMPLE 1

An ethylene/propylene copolymer having an intrinsic viscosity of 0.58 (measured in xylene at 25° C.) and having a number average molecular weight of about 14,000 (deduced from GPC) and having terminal unsaturation was sulfonated and neutralized as described herein. The polymer had 84.1% by weight of ethylene and the remainder was propylene. The unsaturation measured in this polymer was 52.6% vinylidene unsaturation. Ten grams of this polymer and 100 milliliters of hexane were charged in a 500 milliliter round bottom flask that was equipped with nitrogen purge, condenser, air stirrer and thermometer. The charge was stirred and heated to 53° C. to dissolve the polymer. After cooling to 35° C., 0.51 ml of acetic anhydride, followed by 0.2 ml $H_2SO_4$ was added. The reaction mixture was stirred and maintained at a temperature of 35° C. and after 15 minutes 0.25 ml of additional acetic anhydride and 0.1 ml additional sulfuric acid was added. The reaction mixture was continued to be stirred at 35° C. for a total of 1 hour. Thereafter, 4 ml of methanol and 0.42 g NaOH dissolved in 2 ml of water and 1 ml of methanol was added. The reaction mixture was then allowed to stand overnight, was subsequently steam stripped, air dried in a hood overnight and vacuum oven dried at 60° C. to a constant weight. The levels of sulfonating agents (and neutralization agents) employed in this example were in substantial excess to ensure complete sulfonation. This sample is designated Sample 1.

EXAMPLE 2

50 g of an ethylene/propylene copolymer having a number average molecular weight of 800 and terminal unsaturation was dissolved in 500 ml hexane in a 1 liter round bottom flask that was equipped with a nitrogen purge, condenser, air stirrer and thermometer. 13.1 ml of acetic anhydride was added to the stirred solution. Then 5.18 ml concentrated $H_2SO_4$ was added slowly. A temperature rise of 6.5° C. was observed. A slight brownish color developed, changing to light purple after 20 minutes. The reaction mixture was allowed to stir 3 ½ hours. Next 20 ml of methanol was added, followed by 3.75 g NaOH dissolved in 10 ml water and 5 ml methanol. After stirring 2 hours, the reaction mixture was transferred to a 500 ml stoppered graduate and allowed to stand overnight. A clear top layer and a small cloudy lower layer formed. The top layer was evaporated to recover the sulfonated polymer which was vacuum oven dried to constant weight. Sulfur analysis showed 5.07% sulfur incorporated (sulfonation level of 158 meq/100 g polymer). These results are consistent with the product containing some excess salts due to an excess of sulfonating and neutralization reagents. This sample is designated Sample 2.

EXAMPLE 3

50 g of an ethylene/butadiene copolymer having a high degree of terminal unsaturation and a number average molecular weight of 6650 was dissolved in 500 ml hexane and sulfonated as in Example 2. In this case, 1.75 ml acetic anhydride and 0.69 ml concentrated $H_2SO_4$ was added for the sulfonation step and 0.5 g NaOH in $H_2O$/methanol was added in the neutralization step. The reaction product was allowed to settle and the top (slightly cloudy) layer evaporated to recover the neutralized sulfonated polymer which was vacuum oven dried to constant weight. Sulfur analysis showed 0.48% sulfur incorporated (sulfonation level of 15 meq/100 g polymer). This sample is designated Sample 3.

EXAMPLE 4

Viscosity measurements were conducted on the unsulfonated (precursor) and sulfonated polymer (Samples 2 and 3) of Examples 2 and 3 at various concentrations in xylene according to the method described in F. W. Billmeyer, "Textbook of Polymer Science", Second Edition, Wiley Interscience (1971). The results are shown in Table 1. It is clear that the sulfonated adduct at all concentrations possesses a higher reduced viscosity value than the unsulfonated precursor. More importantly, this behavior is observed even at very dilute concentrations (below 0.2 wt. % of polymer). These results clearly demonstrate that these monosulfonated adducts are very effective viscosifiers over an extremely wide concentration range. Furthermore, they display excellent solubility characteristics in low polarity hydrocarbons, even at high sulfonate levels (i.e., at sulfonation levels > 100 milliequivalents per 100 grams of polymer). This behavior is markedly different from that of conventional sulfonate ionomers.

TABLE 1

Reduced Viscosity Vs. Concentration in Xylene at 25° C.

| Concentration (%) | Polymer of Example 2 | | Polymer of Example 3 | |
|---|---|---|---|---|
| | Precursor | Sample 2 | Precursor | Sample 3 |
| 8 | .073 | 0.24 | 0.68 | 2.53 |
| 4 | .064 | 0.16 | 0.44 | 0.91 |
| 2 | .060 | 6.15 | 0.36 | 0.56 |
| 1 | .057 | 0.14 | 0.32 | 0.46 |
| 0.5 | .055 | 0.13 | 0.30 | 0.40 |
| 0.25 | .049 | 0.13 | 0.295 | 0.38 |
| 0.125 | .035 | 0.13 | 0.284 | 0.37 |

EXAMPLE 5

The unsulfonated (precursor) and sulfonated (Sample 1) polymers from Example 1 were dissolved in Solvent 100N mineral oil at concentrations ranging from 2 wt. % down to 0.063 wt. % and their viscosities measured at 25° C. and the reduced viscosities were established. The data are summarized in Table 2. It is evident that the sulfonated adduct (Sample 1) is a much more effective thickening agent than the unsulfonated precursor at a concentration of 2%. As the polymers are diluted, this thickening advantage decreases until at 0.063% concentration the effect is lost. It is clear that at extreme dilution for a single functional group attached to a high molecular weight polymer, there is insufficient association between different ionic groups to achieve a thickening advantage. For lower molecular weight polymers, as in Table 1, this is not the case.

TABLE 2

Viscosity and Reduced Viscosity at 25° C. Vs. Concentration in 100 Neutral Oil

| Concentration (%) | Precursor | | Sample 1 | |
|---|---|---|---|---|
| | Viscosity (cs) | Reduced Viscosity | Viscosity (cs) | Reduced Viscosity |
| 2 | 100 | 0.82 | 135 | 1.28 |
| 1 | 61 | 0.62 | 66 | 0.74 |
| 0.5 | 47.9 | 0.54 | 49 | 0.59 |
| 0.25 | 42.6 | 0.51 | 42.9 | 0.52 |
| 0.125 | 40.1 | 0.49 | 40.2 | 0.49 |
| 0.063 | 38.9 | 0.49 | 39 | 0.47 |

EXAMPLE 6

The polymers (precursor and Sample 1) of Example 1 were dissolved in Solvent 100N mineral oil at 2 wt. % concentration and their viscosities determined at temperatures ranging from 25° C. to 100° C. The data are summarized in Table 3. At all temperatures, it is apparent that the reduced viscosity of the sulfonated adduct is greater than the precursor, in some cases about 2 times greater. There is also evidence that the sulfonated adduct displays a maximum in reduced viscosity near 50° C., unlike the precursor. It is believed that the combination of a sulfonate group at the end of the polymer chain, coupled with modest crystallinity in the ethylene/alpha olefin polymer chain, makes these materials more effective in selected temperature regions than for the unsulfonated adduct.

TABLE 3

Viscosity and Reduced Viscosity at 2% Concentration in 100 Neutral Oil

| Temperature (°C.) | Precursor | | Sample 1 | |
|---|---|---|---|---|
| | Viscosity (cs) | Reduced Viscosity | Viscosity (cs) | Reduced Viscosity |
| 25 | 100 | 0.82 | 135 | 1.28 |
| 40 | 53 | 0.84 | 84 | 1.62 |
| 50 | 36 | 0.79 | 62 | 1.71 |
| 60 | 25 | 0.76 | 42 | 1.58 |
| 75 | 17 | 0.73 | 27 | 1.47 |
| 100 | 9.4 | 0.67 | 14 | 1.28 |

EXAMPLE 7

The samples from Example 3 were dissolved in Solvent 150N oil at 5 wt. % concentration and their viscosities measured at temperatures ranging from 25° to 100° C. The data are shown in Table 4. Clearly, the sulfonated adduct is much more potent as a thickening agent at all temperatures.

TABLE 4

Viscosity and Reduced Viscosity at 5% Concentration in 150 Neutral Oil

| Temperature (°C.) | Precursor | | Sample 3 | |
|---|---|---|---|---|
| | Viscosity (cs) | Reduced Viscosity | Viscosity (cs) | Reduced Viscosity |
| 25 | 178 | 0.39 | 302 | 0.80 |
| 50 | 55 | 0.35 | 90 | 0.70 |
| 75 | 23 | 0.31 | 37 | 0.61 |
| 100 | 12 | 0.28 | 19 | 0.54 |

What is claimed is:

1. A neutralized sulfonated ethylene/alpha olefin copolymer obtained by sulfonating and neutralizing an ethylene/alpha olefin copolymer having terminal unsaturation, at least 30% of which is vinyl idene unsaturation.

2. The polymer of claim 1 wherein the ethylene/alpha olefin copolymer has at least 50% terminal unsaturation.

3. The polymer of claim 2 wherein the ethylene content of the ethylene/alpha olefin copolymer is in the range of from about 30 to about 90 wt. %.

4. The copolymer of claim 3 wherein the ethylene/alpha olefin copolymer has a number average molecular weight of from about 800 to about 50,000.

5. The copolymer of claim 3 wherein the alpha olefin has from 3 to about 12 carbon atoms.

6. A neutralized sulfonated ethylene/alpha olefin copolymer obtained by sulfonating and neutralizing an ethylene/alpha olefin copolymer selected from ethylene/alpha olefin having number average molecular weights of from about 800 to about 50,000, an ethylene content of from about 30 wt. % to about 90 wt. %, and from at least 50% to about 70% terminal unsaturation, of which from about 30% to about 50% is vinylidene unsaturation.

7. The neutralized sulfonated copolymer of claim 6 wherein the alpha olefin has from 3 to about 12 carbon atoms.

8. A lubricating composition comprising lubricating oil and a neutralized sulfonated ethylene/alpha olefin copolymer additive, said neutralized sulfonated ethylene/alpha olefin copolymer comprising the reaction product of:

(a) an ethylene/alpha olefin copolymer having a number average molecular weight of from about 5,000 to about 50,000 and at least 50% terminal unsaturation, at least 30% of which is vinylidene unsaturation, (b) a sulfonating agent; and (c) a neutralizing agent.

9. The composition of claim 8 wherein the additive is present in an amount ranging from about 0.1 wt. % to about 20 wt. %.

10. The composition of claim 9 wherein the alpha olefin is propylene, the sulfonating agent is acetylsulfate and the neutralizing agent is a base or a basic salt.

11. A method of altering the viscosity of a hydrocarbon fluid comprising adding to the hydrocarbon fluid from about 0.1 wt. % to about 20 wt. % of a neutralized sulfonated ethylene/alpha olefin copolymer obtained by sulfonating and neutralizing an ethylene/alpha olefin copolymer selected from ethylene/alpha olefin having number average molecular weights of from about 800 to about 50,000, an ethylene content of from about 30 wt. % to about 90 wt. %, and from at least 50% to about 70% terminal unsaturation, of which from about 30% to about 50% is vinylidene unsaturation.

* * * * *